US010878514B2

(12) United States Patent
Bender et al.

(10) Patent No.: US 10,878,514 B2
(45) Date of Patent: Dec. 29, 2020

(54) EXPENSE VALIDATOR

(71) Applicant: INTERNATIONAL BUSINESS MACHINES CORPORATION, Armonk, NY (US)

(72) Inventors: Michael Bender, Rye Brook, NY (US); Siddhartha Sood, Indirapuram (IN); Michael Shute, Niantic, CT (US); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/108,377

(22) Filed: Aug. 22, 2018

(65) Prior Publication Data

US 2020/0065912 A1    Feb. 27, 2020

(51) Int. Cl.
*G06Q 10/06* (2012.01)
*G06Q 40/00* (2012.01)
(Continued)

(52) U.S. Cl.
CPC ......... *G06Q 40/12* (2013.12); *G06K 9/00463* (2013.01); *G06K 9/00664* (2013.01);
(Continued)

(58) Field of Classification Search
CPC . G06Q 40/12; G06K 9/00463; G06K 9/00664
See application file for complete search history.

(56) References Cited

U.S. PATENT DOCUMENTS

| 2005/0222944 | A1* | 10/2005 | Dodson, Jr. | ............ | G06Q 10/10 705/39 |
| 2008/0046347 | A1* | 2/2008 | Smith | .................... | G06Q 20/14 705/30 |

(Continued)

FOREIGN PATENT DOCUMENTS

WO    WO2017010936 A1    1/2017
WO    WO2017142618 A1    8/2017

OTHER PUBLICATIONS

Disclosed Anonymously, Method and System for Real Time Expense Reimbursement, Abstract, p. 2,3, IPCOM000228184D, Jun. 11, 2013, entire document.
(Continued)

*Primary Examiner* — Talia F Crawley
(74) *Attorney, Agent, or Firm* — Patrick J. Daugherty; Daugherty & Del Zoppo Co., LPA

(57) ABSTRACT

Embodiments of an expense validator extract from an expense receipt object expense event data that includes identification of an expense entity, a geographic location, a time of the expense event, a person authorized to submit a claim for expenses to an expense management system, and another person that is associated to the authorized person as an attendee of the expense event. The embodiments acquire proof-of-location data at a time period inclusive of the expense event time from a first mobile device that is associated with the authorized person; determine from the acquired proof-of-location data indirect proof-of-location data indicative of attendance of the other person at the expense event geographic location during expense event time; and validate a submission of the expense receipt object as a function of the proof-of-location data.

19 Claims, 4 Drawing Sheets

(51) Int. Cl.
*G06K 9/00* (2006.01)
*G06Q 20/32* (2012.01)
*G10L 17/00* (2013.01)

(52) U.S. Cl.
CPC .......... *G06Q 20/3224* (2013.01); *G10L 17/00* (2013.01); *G06K 2209/01* (2013.01)

(56) References Cited

U.S. PATENT DOCUMENTS

| | | | |
|---|---|---|---|
| 2013/0085908 A1* | 4/2013 | Singh | G06Q 10/06 705/30 |
| 2015/0142661 A1* | 5/2015 | Jain | G06Q 20/10 705/44 |
| 2017/0010936 A1* | 1/2017 | Daoud | H04W 4/029 |

OTHER PUBLICATIONS

Andrew Kunesh, The 7 Best Expense Tracking Apps for Smarter Business Travel, p. 1,2,3,8, zapier.com, Nov. 13, 2017, entire document.

Peter Mell et al, The NIST Definition of Cloud Computing, National Institte of Standards and Technology, Publication 800-145, 2011, entire document.

Javax.imageio.metadata, Class IIOMetadata,Java Platform, Standard Ed. 7, 2018, entire document.

Wikipedia, International Press Telecommunictions Council, 2018, entire document.

Wikipedia, Exif, Exchangeable image file format, 2018, entire document.

\* cited by examiner

EXPENSE VALIDATOR

BACKGROUND

Expense management refers to the systems deployed to process, pay, or audit authorized or appropriate expenses. Illustrative but not exhaustive examples of business, education or tax expenses commonly include expenses incurred for travel and entertainment, tuition and training, equipment or operational costs, defined improvements and asset depreciations.

Expense management includes policies and procedures that govern expenses and other spending, as well as the technologies and services utilized to process and analyze associated data. Automation of expense management generally requires the execution of two separate processes: a submission process that a user follows in order to complete an expense claim (for example, logging a hotel receipt or submitting mobile phone records), and a validation process to approve or disapprove the expense claim. An automated solution typically requires design and implementation of expense coding processes that transform expense data into data objects amenable to data processing.

SUMMARY

In one aspect of the present invention, in a computerized method, a computer processor is configured to extract from an expense receipt object expense event data that includes identification of an expense entity, a geographic location, a time of the expense event, a person authorized to submit a claim for expenses to an expense management system, and another person that is associated to the authorized person as an attendee of the expense event. The configured processor acquires direct proof-of-location data at a time period inclusive of the expense event time from a first mobile device that is associated with the authorized person; determines from the direct proof-of-location data indirect proof-of-location data that is indicative of attendance of the another person at the expense event geographic location during expense event time; and validates a submission of the expense receipt object to the expense management system as a claim for credit of an amount of the expense event as a function of the acquired direct proof-of-location data and the determined direct proof-of-location data.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to extract from an expense receipt object expense event data that includes identification of an expense entity, a geographic location, a time of the expense event, a person authorized to submit a claim for expenses to an expense management system, and another person that is associated to the authorized person as an attendee of the expense event. The configured processor acquires direct proof-of-location data at a time period inclusive of the expense event time from a first mobile device that is associated with the authorized person; determines from the direct proof-of-location data indirect proof-of-location data that is indicative of attendance of the another person at the expense event geographic location during expense event time; and validates a submission of the expense receipt object to the expense management system as a claim for credit of an amount of the expense event as a function of the acquired direct proof-of-location data and the determined direct proof-of-location data.

In another aspect, a computer program product for an expense validator has a computer-readable storage medium with computer readable program code embodied therewith. The computer readable program code includes instructions for execution which cause the processor to extract from an expense receipt object expense event data that includes identification of an expense entity, a geographic location, a time of the expense event, a person authorized to submit a claim for expenses to an expense management system, and another person that is associated to the authorized person as an attendee of the expense event. The processor is configured to acquire direct proof-of-location data at a time period inclusive of the expense event time from a first mobile device that is associated with the authorized person; determine from the direct proof-of-location data indirect proof-of-location data that is indicative of attendance of the another person at the expense event geographic location during expense event time; and validate a submission of the expense receipt object to the expense management system as a claim for credit of an amount of the expense event as a function of the acquired direct proof-of-location data and the determined direct proof-of-location data.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
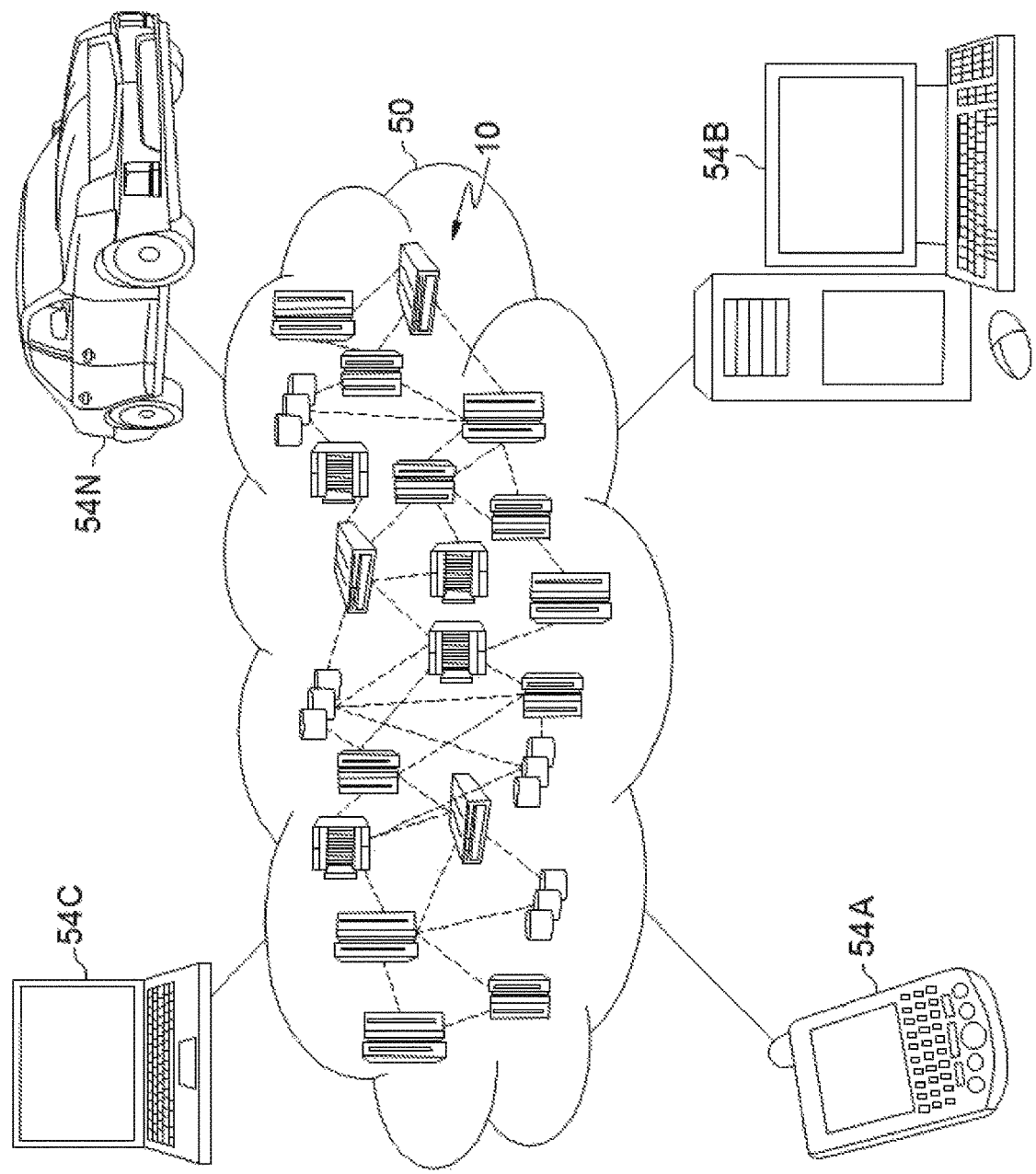
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
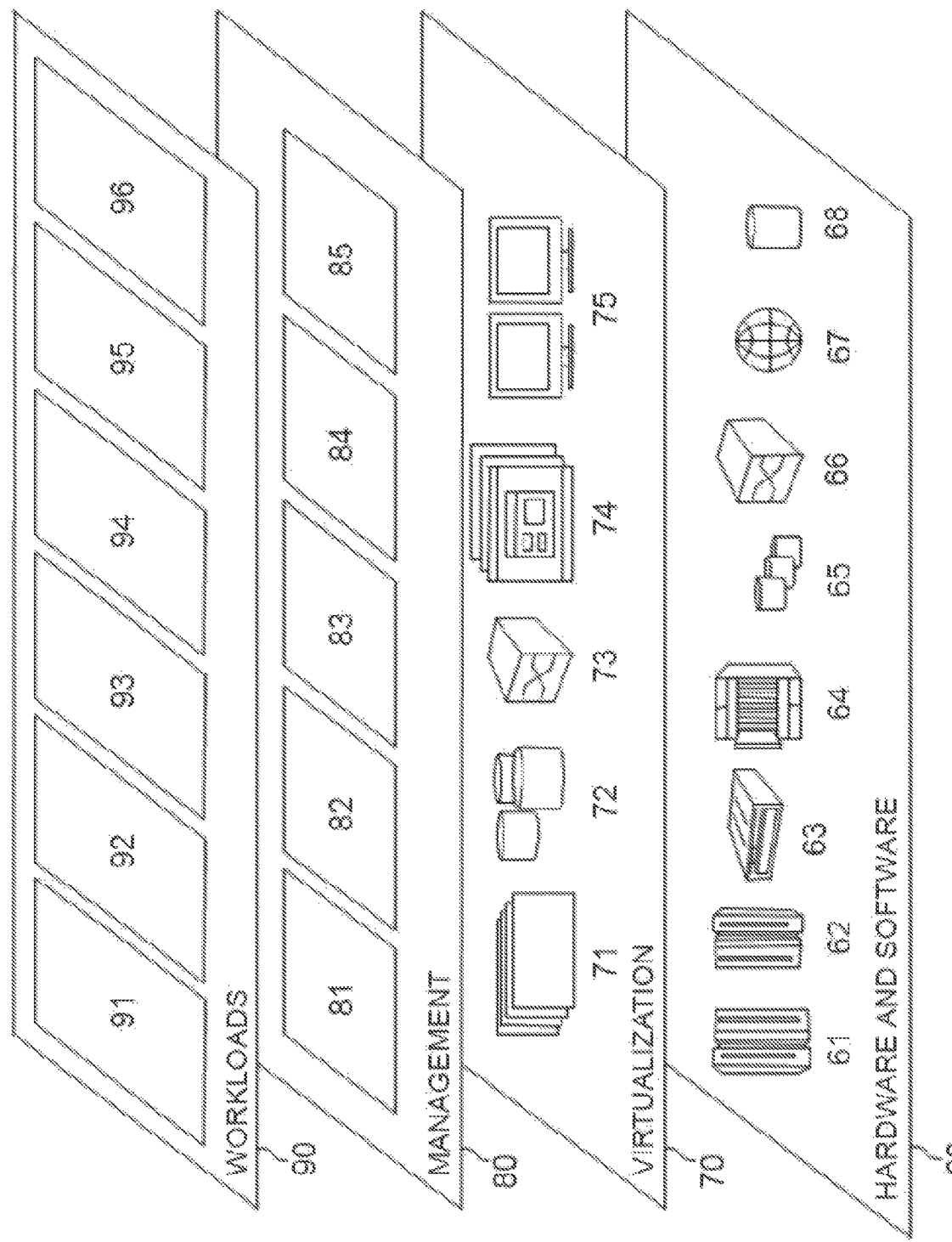
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for an expense validator according to embodiments of the present invention 96.

Figure 3:
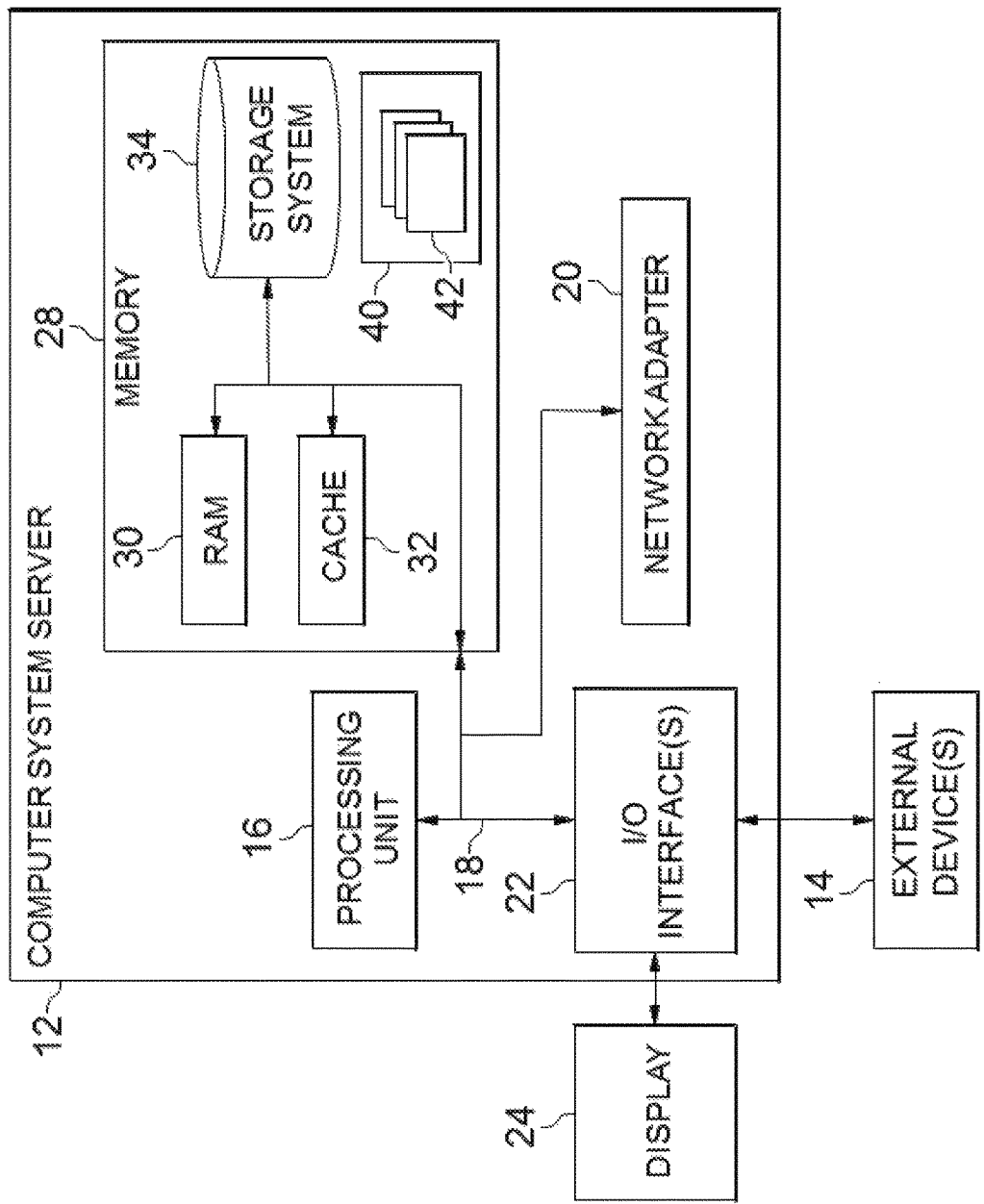
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
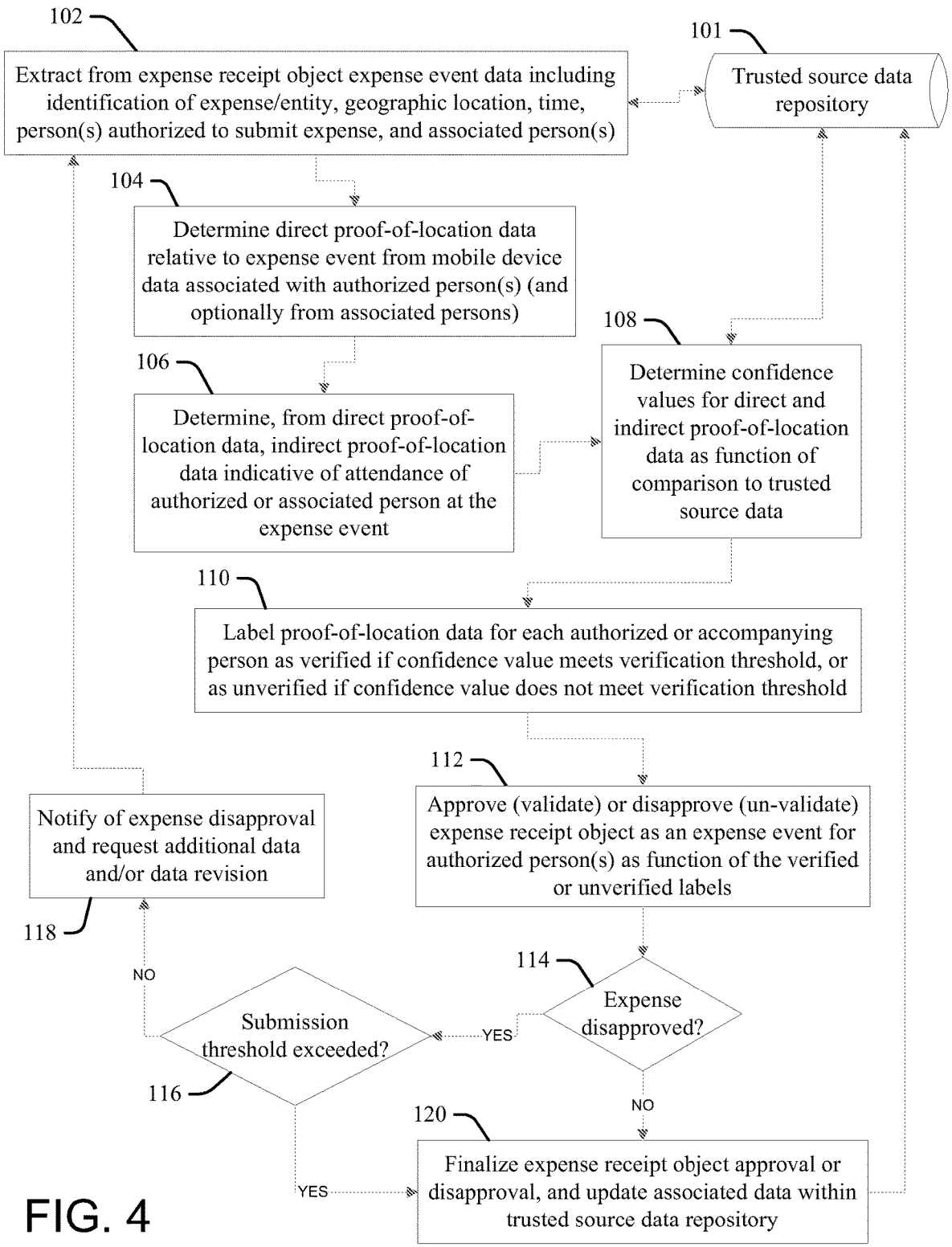
FIG. 4 is a flow chart illustration of an embodiment of the present invention.

FIG. 4 illustrates an expense validator according to embodiments of the present invention. A processor (for example, a central processing unit (CPU)) executes code (such as code installed on a storage device in communication with the processor) and is thereby configured according to the present invention (a "configured processor") at 102 to extract from an expense receipt object an expense event data that includes:

(i) entity or expense identification: for example, a restaurant name for a business meal expense, a department name for which the expense is allocated, goods purchased or name of provider of service expense, or other description indicia;

(ii) a geographic location of the expense entity defined or represented by the expense receipt object, such as business address, a location of provision of services, or of acceptance or delivery of goods, etc.;

(iii) a time of the expense (calendar date, time of day, etc.);

(iv) an authorized person or persons: namely, the person(s) incurring or otherwise associated with the expense that is/are authorized to submit a claim for reimbursement or credit of an amount of the expense event to an expense management system (illustrative but not limiting or exhaustive examples include employee, contractor, student, co-workers or teammates, etc.); and (v) other person(s) associated to the authorized person as an attendee of the expense event: for example, co-workers or clients present at a business meal expense location, guests of the authorized person at a ticketed sporting event, family members accompanying an authorized person on a business travel expense trip, etc. Such "other" persons may or may not be authorized to submit the expense for reimbursement, tax credit, etc.; it is their attendance, participation or other association to the event that generates their relevance to the event.

Identifying the expense entity at 102 may include using look-up routines to match the processed receipt data to business names, including as a function of matching expense type to type of business associated with the expense entity within publicly available websites and other information databases.

Identifying the authorized and/or accompanying/associated persons at 102 may include verifying or matching digital signatures and other identifying digital data indicia or representations of the authorized or associated persons as a function of, or to, data within a trusted source database or other data repository 101. A digital signature is a mathematical representation or scheme for presenting the authenticity of digital messages or documents, wherein the configured processor validates a digital signature provided by an authorized or associated person and associated to the expense object as a function of data within the trusted source repository 101 that is labeled as associated with a specific person.

Identifying digital data indicia used by the configured processor at 102 to identify authorized or accompanying/associated persons as a function of data within the trusted source repository 101 may also include telephones numbers, individual mobile device identifiers, social network activity, pictures and voice prints of persons that are provided by employers, schools, organization or other trusted or verified entities. Thus, the configured processor may match corresponding "digital expense data" determined at 102 that is inclusive of voice prints, facial recognition data, biometric data, etc., acquired at the time of creation or submission of the expense event data by a submitting, authorized person) to data within the trusted source repository 101 that is labeled as associated with a specific person.

At 104 the configured processor obtains or determines proof-of-location data with respect to the expense event from an "Internet of Things" ("IoT") enabled mobile device mobile device associated with the authorized person(s) at a time period inclusive of the expense event time, and optionally, from one or more of other mobile devices that are associated to the accompanying persons. The mobile device proof-of-location verification data is generated at a particular time, and examples include direct time and location data provided by a smartphone, smart watch, personal fitness or health tracker, tablet or laptop computer, or an automobile, motorcycle, bicycle, scooter, mass transit vehicle or other transportation device with IoT functionality, and still other examples will be apparent to one skilled in the art.

In some embodiments the configured processor determines at 106 indirect expense event proof-of-location data with respect to authorized or accompanying persons that is derived from the direct data determined at 104. For example, the configured processor may determine at 106 the presence of authorized or accompanying persons within image data of a picture that has time and location metadata correlated with a time and location of the expense event, wherein this correlation indicates indirectly that said person(s) were at the location of the expense event at the time of a claimed expense, as established by IoT direct data processed at 104 to locate an authorized person at 104 at the expense event at that time and place.

The configured processors of embodiments of the present invention extract and process data at 102, 104, and 106 that is indicative of person or entity identification, including via applying optical character recognition (OCR) and natural language processing (NLP) processes to identify text content of the expense object. Said configured processors may determine time and date of expense object image creation or acquisition from time and date stamps and other file or expense object data or metadata. Said configured processors may determine geographic location data for expense object creation or submission from global positioning satellite (GPS) coordinates, cell phone tower transmission or location data, social media check-in or location tagging, etc.); electronic messaging, WiFi (Wireless Fidelity), cellular or other communication records indicating physical proximity of the authorized and accompanying persons to each other during the time of generation; social media activity indicating the co-location of the authorized and accompanying persons within a same location at a same time, such as at a same mass assembly event (concert, seminar, trade show, etc.). Still other appropriate proof-of-location data considered and processed at 102, 104, or 106 will be apparent to one skilled in the art.

Thus, in one example the configured processor determines at 104 direct proof-of-location data for a first person of a plurality of persons that are identified as authorized or accompanying persons associated with an expense object at 102, wherein the direct proof-of-location data for the first person indicates the geographic location at a particular time of a personal IoT enabled device of the first person (laptop, watch, car or smartphone, etc.). In this example, the configured processor does not determine or find similar direct IoT direct proof-of-location data for a second person of the authorized or accompanying plurality of persons, but instead determines at 106 indirect proof-of-location data for attendance of the second person at the same expense event (business lunch, etc.) as a function of the first person's IoT proof-of-location data: determining that the second person was with the validated first person within a time-stamped picture or captured audio or video content or social network data content. For example, the configured processor verifies the presence of the second person with the first person within a photo generated by IoT device of the first person at the first person direct proof-of-location data geographic location and particular time (via image recognition analysis, parsing social media tagging metadata, etc.), or identifies the voices of both or the first the second person within an audio file generated at the first person direct proof-of-location data particular time (via comparison to voice prints stored in the trusted repository 101).

At 108 the configured processor determines (assigns) a strength or confidence value to the direct and indirect proof-of-location data determined at 104 or 106 as function of comparison to data within the trusted source database

101. For example, embodiments may determine confidence values for identities determined for the authorized and/or accompanying persons within the direct or indirect proof-of-location data. For example, the configured processor determines an amount or confidence that biometric, image or audio data acquired and determined at 104 or 106 to be associated with a specific person matches to fingerprint data, voice print data and/or image data that is stored in the trusted source database 101 and labeled to that specific person.

At 110 the configured processor determines whether the strength or confidence values determined for each of the authorized and accompanying persons at 104 or 106 meet a requisite verification threshold confidence or precision value, and accordingly labels the proof-of-location data for each of the persons as verified if the threshold value is met, or as unverified if the threshold value is not met.

At 112 the configured processor validates (approves) or un-validates (disapproves) the expense receipt object as a function of the verified or unverified label values applied at 110 to the proof-of-location data of each of the authorized and accompanying persons. Embodiments may generate a validity or approval confidence factor or score for the expense at 112, including a value selected from a graduated or continual spectrum of possible values, wherein the value indicates a relative confidence in approval (or disapproval) of the submitted expense, and then apply an appropriate threshold to the value to determine whether to automatically approve, disapprove or audit the expense.

In response to determining at 114 that the expense receipt object stands disapproved (not validated) after the process at 112, at 116 the configured processor determines whether an applicable submission threshold has been exceeded (for example, whether a time period designated to submit additional documents or other proof-of-location data in support of the expense claimed by the expense receipt object has elapsed, or whether one of the authorized and accompanying persons has exceeded a permissible number of data submission attempts to correct submission deficiencies, and still other threshold criteria will be apparent to one skilled in the art).

In response to determining at 116 that said submission threshold has not been exceeded, at 118 the configured processor notifies an appropriate person (one or more of the authorized or associated persons, or an auditor or supervisor or service provider, etc.) of the expense disapproval and requests additional data submissions, or revisions to submitted data, and returns to the data extraction process at 102 to process any of said additional data submissions or data revisions submitted in response to said notice at 118. For example, the configured processor may at 118 notify those of the authorized and accompanying persons that have failed to submit documentation or other data in support of the expense object that other have submitted or provided documentation or data, and request timely or adequate submission of supporting documents or data, for example, via the following email or text notification message: "Bill, you're the only attendee of the July 17$^{th}$ business lunch at "Trader Marge's Restaurant" that has not provided a submission in support of the claimed expense, please submit document or personal mobile device proof-of-location data within five (5) business days or the expense will be disapproved."

In another example the configured processor at 118 notifies an auditor, manager, service provider, etc., that the expense has been determined at 112 to be improper or likely fraudulent, and request clarification or additional information. For example, notice at 118 may include a message to an information technology department that proof-of-location data obtained by the mobile devices of a plurality of the authorized or associated persons and associated to a time of a business lunch event is inconsistent (not all devices are reporting a same geographic location within an acceptable distance precision), and therefore that the associated expense request has been marked as likely fraudulent and disapproved, and requesting a submission to resolve the geographic data problem, or an over-riding authorization submission by the information technology department, in order to reconsider and approve the expense (in a subsequent iteration at 112).

In response to determining at 114 that the expense receipt object stands approved (validated), or to determining at 116 that said submission threshold has been exceeded, at 120 the configured processor finalizes the approval or disapproval of the expense receipt object, and updates associated data within trusted source data repository 101. For example, the configured processor updates data associated with a first person of the authorized and accompanying persons of the expense object to reflect the approved or disapproved status of the present expense object (for example, increments an appropriate counter), and the association of first person to others of the authorized or accompanying persons with respect to the expense object, wherein the updated data values are used in subsequent iterations of the process of the present embodiment.

Accordingly, embodiments of the present invention automatically calculate confidence values for data items submitted in support of an expense claim represented by the expense object, wherein multiple (authorized and accompanying person) collaborators are each enabled to submit information required to verify (or modify) a given expense claim in order to achieve approval of the submitted claim. In the event that any authorized or accompanying persons fails to submit adequate or acceptable proof-of-location data (as determined at 104, 106, 108, or 110 of FIG. 4), embodiments provide notice of a pending disapproval and invite additional submissions or revisions in support of approval, until a threshold time, submission iteration count or other limiting threshold value is met, wherein the determination is finalized. Thus, in the circumstance where just one person submits proof-of-location data, or three of four persons attending an expense event, embodiments give the other persons an opportunity to submit data that could, or does, modify the expense object data to support approval of the associated expense (for example, with respect to verifying location data, or providing another receipt in support of documents associated to the expense object, etc.)

Claiming business expense reimbursement or tax deductions is often a time-consuming and non-productive use of time under prior art techniques. The time and effort required to reliably identify and eliminate fraudulent expenses may slow down submission and verification processes to an unsatisfactory level. While proof-of-expense documents may be quickly provided by a submitter, significant processing cycle times may be required to verify the submitted proof of activity documents. Thus, in the prior art approvals of expenses often get stuck in audit cycles that require manual verifications that delay the whole settlement process. In some cases, manual verification may not be feasible.

Moreover, business expenses may be claimed for the purpose of tax exemptions and rebates or credits. In some cases, such allowances are misused where personal expense documents are intentionally or unintentionally submitted as business expenses. Resources allocated to auditing submissions to governmental agencies may be limited, resulting in failures to recognize and prevent fraudulent or improper tax expense or credit, and the proportional loss of tax revenue.

In contrast, embodiments of the present invention provide systems and method which autonomously and automatically audit digital data submissions representing or defining expenses incurred, wherein each submission may be efficiently validated or dis-approved based on confidence values assigned to the likelihood that each person associated with a submitted expense event is properly associated with the event, including by using information gleamed from data from registered mobile devices. Expense and tax system service providers are enabled to use this digital information in verifying proof of expense, as well as of the provenance to prove the activity was properly claimed; where confidence values fail to meet requisite thresholds, audited expense event data may be quickly audited and labeled as (likely) fraudulent or improper.

Embodiments enable users to add contextual information on a digital expense bill which can be used as proof of activity when claiming these expenses. A validated authorization of the expense would include the bill image and contextual information such as GPS logs of the individuals listed on an expense, images, audio or video analysis of people listed on an expense compared to a pre-captured footprint, or any other of a list of registered devices that can place a person at a location and/or with other people.

In situations where the expenses are for plurality of users, the system will allow a first authorized or submitting user to create the initial expense claim and enter some or all of the contextual data, as appropriate. Other associated individuals may to supplement the contextual data as needed, via direct or indirect data submissions or determinations (for example, at 104 or 106 of FIG. 4).

Embodiments may incorporate Blockchain mechanisms to provide end-to-end trust and provenance around expense activity. In one example, once a taxpayer creates and submits a digital receipt in support of a claimed tax deduction or credit, upon verification (at 112, FIG. 4), it is made part of a block chain network wherein it is automatically integrated with a tax return document or other submission or refund process. In another scenario, incorporating a verified expense into a blockchain structure help settle expenses faster between departments where multiple participants from different departments are part of the same expense.

In one example, Tom, Sara, Michele, and Sam went together to an employee dinner as part of a business trip. Tom paid for everyone and took the picture of the bill along with the credit card receipt. Tom uploaded the digital image of the bill and credit card receipt through his phone to a processor configured according to an embodiment of the present invention, wherein the configured processor autonomously extracts relevant claim information from the credit card receipt (for example, though pre-training and OCR processes), and adds Tom's current location at the restaurant (as reported by current GPS coordinates of Tom's mobile phone) to the transaction history. Tom also tags Sara, Michele and Sam on the digital receipt. Sara, Michele, and Sam use the same process and add their corporate identity and geo-location and current time on the expense bill.

Tom submits this digital signed expense report to the expense reimbursement system. In response to determining that Sara's mobile device geo-location data does not match the geo-location of restaurant or of Tom, Michele and Sam, the system flags Sara's proof-of-location data as unverified (at 110, FIG. 4). However, the proof-of-location data for each of Tom, Michele and Sam are flagged as verified; accordingly, wherein an approval threshold is set to 75% or lower, the expense is automatically and immediately approved (at 112, FIG. 4) in response to the data flags.

In another example, Bob went to a business trip to New York. His phone location data indicates that Bob was there for a time period claimed by Bob as the duration of the business trip, enable the system to quickly and automatically approve a claim by Bob for reimbursement of airfare and trip expenses. In contrast, wherein Bob's mobile phone location data shows no evidence that he was in New York during the trip duration, and the transaction is flagged as questionable, and the claim denied.

In another example, Rohan submits a gas expense digitally signed with a location of a gas station, wherein a time on the expense receipt matches the time on an associated transaction at the gas station. Rohan also takes a picture of the company vehicle where the gas is being filled. Rohan submits the digitally-signed gas expenses as business expenses, and system quickly and autonomously verifies and approves the expense as a function of validity flags assigned to each of the proof-of-location data items.

In another example, Bill, Mark, and Diana are working late at office and order food. A company policy caps an upper limit on such expenses, per person. Mike being part of the team is working from home that day. Bill pays the bills and signs it for Bill, Mark, Diana, and Mike. Since the digital signature of the expense is not able to prove Mike being co-located with the team (due to a lack of geographic location information from a mobile device associated with Mike; or due to conflicting location information provided by the computer terminal device used by Mike to communicate with Bill, Mark, or Diana at the office), the system flags the expense as questionable, and requests clarifying information in order to approve the expense.

In another example, Walter submits a travel bill to claim tax benefits for his business as per government tax policies. Walter digitally validates his expenses and adds them to the system, which puts it on a block chain where they are validated. During filing of his tax return, Walter's accountant accesses the blockchain and provide reference numbers on his tax return for validation.

Thus, embodiments of the present invention define novel expense submission validation processes that use location and time-stamp data reported by IoT and other mobile devices to create a digitally-validated expense report objects that provide proof of individual expense activity. By using OCR technology embodiments are enabled to extract relevant information from the expense bill or expense report submissions that are correlated and added to digital signature data and provide proof of expense activity.

The embodiments enable multiple persons to collaborate and digitally sign an expense, enhancing the validity or confidence of proof of the group activity as a legitimate expense through verification by each person submitted data.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting, from an expense receipt object, expense event data comprising identification of an expense entity, a geographic location, a time of the expense event, and identification of a person authorized to submit a claim for expenses to an expense management system;
   acquiring direct proof-of-location data at a time period inclusive of the expense event time from a first mobile device that is associated with the authorized person;
   determining, from the direct proof-of-location data, indirect proof-of-location data that is indicative of attendance of another person at the expense event geographic location during expense event time; and
   validating a submission of the expense receipt object to the expense management system as a claim for credit of an amount of the expense event as a function of determining from the acquired direct proof-of-location data and the determined direct proof-of-location data that the another person attended the expense event with the authorized person; and
   wherein the determining the indirect proof-of-location data is selected from the group consisting of:
   determining, via image data analysis, a presence of the another person with the authorized person within image data of a picture generated by the first mobile device at the expense event geographic location and time; and
   determining, via comparison to labeled voice print data, that voice data within an audio file generated at the expense event geographic location and time is generated by each of the another person and the authorized person.

2. The computer-implemented method of claim 1, wherein the expense receipt object comprises a printed receipt, and the extracting the expense event data from the expense receipt object comprises using optical character recognition and natural language processing to identify text content displayed within the printed receipt.

3. The computer-implemented method of claim 1, wherein the determining the indirect proof-of-location data further comprises determining a presence of the another person at the expense event geographic location and time as a function of social media check-in or location tagging data.

4. The computer-implemented method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the extracting the expense event data, the acquiring the direct proof-of-location data, the determining the indirect proof-of-location data from the direct proof-of-location data, and the validating the submission of the expense receipt object.

5. The computer-implemented method of claim 4, wherein the computer-readable program code is provided as a service in a cloud environment.

6. The computer-implemented method of claim 1, further comprising:
   determining a confidence value for one of the direct proof-of-location data and the indirect proof-of-location data as a function of comparison to trusted source data repository; and
   validating the submission of the expense receipt object as a function of the determined confidence value.

7. The computer-implemented method of claim 6, wherein the determining the confidence value comprises:
   determining a percentage of match of biometric data of the one of direct proof-of-location data and the indirect proof-of-location data that is indicative of an identity of a one of the authorized person and the another person to other biometric data that is labeled to the one of the authorized person and the another person and stored in the trusted source data repository.

8. The computer-implemented method of claim 7, wherein the biometric data is selected from the group consisting of a voice print, a finger print and a facial recognition determination result.

9. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   extracts, from an expense receipt object, expense event data comprising identification of an expense entity, a geographic location, a time of the expense event, and identification of a person authorized to submit a claim for expenses to an expense management system;
   acquires direct proof-of-location data at a time period inclusive of the expense event time from a first mobile device that is associated with the authorized person;
   determines, from the direct proof-of-location data, indirect proof-of-location data that is indicative of attendance of another person at the expense event geographic location during expense event time; and
   validates a submission of the expense receipt object to the expense management system as a claim for credit of an amount of the expense event as a function of determining from the acquired direct proof-of-location data and the determined direct proof-of-location data that the another person attended the expense event with the authorized person; and
   wherein the processor determines the indirect proof-of-location data from a process selected from the group consisting of:

determining, via image data analysis, a presence of the another person with the authorized person within image data of a picture generated by the first mobile device at the expense event geographic location and time; and determining, via comparison to labeled voice print data, that voice data within an audio file generated at the expense event geographic location and time is generated by each of the another person and the authorized person.

10. The system of claim 9, wherein the processor executes the program instructions stored on the computer-readable storage medium via the computer readable memory and thereby further determines the indirect proof-of-location data by determining a presence of the another person at the expense event geographic location and time as a function of social media check-in or location tagging data.

11. The system of claim 9, wherein the expense receipt object comprises a printed receipt, and wherein the processor executes the program instructions stored on the computer-readable storage medium via the computer readable memory and thereby extracts the expense event data from the expense receipt object by using optical character recognition and natural language processing to identify text content displayed within the printed receipt.

12. The system of claim 9, wherein the processor executes the program instructions stored on the computer-readable storage medium via the computer readable memory and thereby:

determines a confidence value for one of the direct proof-of-location data and the indirect proof-of-location data as a function of comparison to trusted source data repository; and validates the submission of the expense receipt object as a function of the determined confidence value.

13. The system of claim 12, wherein the processor executes the program instructions stored on the computer-readable storage medium via the computer readable memory and thereby determines the confidence value by determining a percentage of match of biometric data of the one of the direct proof-of-location data and the indirect proof-of-location data that is indicative of an identity of a one of the authorized person and the another person to other biometric data that is labeled to the one of the authorized person and the another person and stored in the trusted source data repository.

14. The system of claim 13, wherein the biometric data is selected from the group consisting of a voice print, a finger print and a facial recognition determination result.

15. A computer program product for an expense validator, the computer program product comprising:

a computer readable storage medium having computer readable program code embodied therewith, the computer readable program code comprising instructions for execution by a processor that cause the processor to:

extract, from an expense receipt object, expense event data comprising identification of an expense entity, a geographic location, a time of the expense event, and identification of a person authorized to submit a claim for expenses to an expense management system;

acquire direct proof-of-location data at a time period inclusive of the expense event time from a first mobile device that is associated with the authorized person;

determine, from the direct proof-of-location data, indirect proof-of-location data that is indicative of attendance of another person at the expense event geographic location during expense event time; and validate a submission of the expense receipt object to the expense management system as a claim for credit of an amount of the expense event as a function of determining from the acquired direct proof-of-location data and the determined direct proof-of-location data that the another person attended the expense event with the authorized person; and wherein the processor is caused to determine the indirect proof-of-location data from a process selected from the group consisting of:

determining, via image data analysis, a presence of the another person with the authorized person within image data of a picture generated by the first mobile device at the expense event geographic location and time; and determining, via comparison to labeled voice print data, that voice data within an audio file generated at the expense event geographic location and time is generated by each of the another person and the authorized person.

16. The computer program product of claim 15, wherein the computer readable program code instructions for execution by the processor cause the processor to further determine the indirect proof-of-location data by determining a presence of the another person at the expense event geographic location and time as a function of social media check-in or location tagging data.

17. The computer program product of claim 15, wherein the expense receipt object comprises a printed receipt, and wherein the computer readable program code instructions for execution by the processor further cause the processor to extract the expense event data from the expense receipt object by using optical character recognition and natural language processing to identify text content displayed within the printed receipt.

18. The computer program product of claim 15, wherein the computer readable program code instructions for execution by the processor further cause the processor to:

determine a confidence value for one of the direct proof-of-location data and the indirect proof-of-location data as a function of comparison to trusted source data repository; and validate the submission of the expense receipt object as a function of the determined confidence value.

19. The computer program product of claim 18, wherein the computer readable program code instructions for execution by the processor further cause the processor to determine the confidence value by determining a percentage of match of biometric data of the one of direct proof-of-location data and the indirect proof-of-location data that is indicative of an identity of a one of the authorized person and the another person to other biometric data that is labeled to the one of the authorized person and the another person and stored in the trusted source data repository.

* * * * *